(12) United States Patent
Banerjee et al.

(10) Patent No.: US 12,162,782 B2
(45) Date of Patent: Dec. 10, 2024

(54) PROCESS FOR REDUCING SELENIUM FROM ION-EXCHANGE BRINE

(71) Applicant: Veolia Water Solutions & Technologies Support, Saint-Maurice (FR)

(72) Inventors: Kashi Banerjee, Carnegie, PA (US); Mohan Badami, Pittsburgh, PA (US); Michael Taylor, Philadelphia, PA (US); Sebastien Bessenet, Naperville, IL (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 344 days.

(21) Appl. No.: 17/625,132

(22) PCT Filed: Jun. 26, 2020

(86) PCT No.: PCT/US2020/039766
§ 371 (c)(1),
(2) Date: Jan. 6, 2022

(87) PCT Pub. No.: WO2021/007046
PCT Pub. Date: Jan. 14, 2021

(65) Prior Publication Data
US 2022/0267175 A1    Aug. 25, 2022

Related U.S. Application Data

(60) Provisional application No. 62/872,938, filed on Jul. 11, 2019.

(51) Int. Cl.
*C02F 1/42* (2023.01)
*C02F 9/00* (2023.01)
(Continued)

(52) U.S. Cl.
CPC ............... *C02F 1/42* (2013.01); *C02F 9/00* (2013.01); *C02F 2001/422* (2013.01);
(Continued)

(58) Field of Classification Search
CPC .... C02F 1/42; C02F 9/00; C02F 1/442; C02F 1/705; C02F 2001/422; C02F 2101/106;
(Continued)

(56) References Cited

U.S. PATENT DOCUMENTS 6,156,191 A   12/2000 Overman
2015/0001157 A1   1/2015 Johnson
(Continued)

OTHER PUBLICATIONS

Santos, S., et al., "Selenium contaminated waters: An overview of analytical methods, treatment options and recent advances in sorption methods", Science of Total Environment, Apr. 2, 2015, pp. 246-260, vol. 521, XP029155793.

*Primary Examiner* — Madeline Gonzalez
(74) *Attorney, Agent, or Firm* — COATS & BENNETT, PLLC

(57) ABSTRACT

The present invention entails a method of treating an ion exchange regenerant stream containing selenate and removing the selenate from the regenerant stream through an oxidation-reduction process where selenate is reduced to selenite and the selenite is adsorbed onto an adsorbent which, in one embodiment, comprises iron oxide or iron oxy hydroxide. In particular, the method includes catalytically reducing the selenate to selenite in a selenate reduction reactor by reacting iron powder with the selenate in the presence of a nickel powder, which functions as a catalyst, to form selenite which is then adsorbed onto the iron oxide or iron oxy hydroxide.

4 Claims, 2 Drawing Sheets

(51) Int. Cl.
  *C02F 1/44*       (2023.01)
  *C02F 1/70*       (2023.01)
  *C02F 101/10*     (2006.01)
(52) U.S. Cl.
  CPC .............. *C02F 1/442* (2013.01); *C02F 1/705* (2013.01); *C02F 2101/106* (2013.01); *C02F 2303/16* (2013.01)
(58) Field of Classification Search
  CPC ... C02F 2303/16; C02F 2209/06; C02F 1/281
  USPC ..... 210/670, 660, 667, 675, 96.1, 96.2, 181, 210/182, 202, 206, 263, 268, 269, 663, 210/681
  See application file for complete search history.

(56) References Cited

U.S. PATENT DOCUMENTS

| | | |
|---|---|---|
| 2017/0081227 A1 | 3/2017 | Riffe et al. |
| 2017/0210647 A1* | 7/2017 | Banerjee ................. B01J 49/09 |
| 2018/0086650 A1* | 3/2018 | Ergang ..................... C02F 1/42 |

* cited by examiner

PROCESS FOR REDUCING SELENIUM FROM ION-EXCHANGE BRINE

FIELD OF THE INVENTION

The present invention relates to wastewater treatment systems and processes, and more particularly to a system and process for removing selenium from a waste stream.

SUMMARY OF THE INVENTION

The present invention is a process for treating an ion exchange regenerant stream containing selenate ($ScO_4^{-2}$) and in the process removing the selenate from the regenerant stream. This process entails processing the regenerant stream in a nanofiltration unit to produce a permeate and a reject stream containing the selenate. Thereafter, the process entails mixing iron and nickel powder with the reject stream in a selenate reduction reactor. The temperature of the reject stream in the selenate reduction reactor is maintained at approximately 60°-80° C. The process entails catalytically reducing the selenate to selenite ($SeO_3^{-2}$) in the selenate reduction reactor by reacting the iron powder with the selenate in the presence of the nickel powder, which functions as a catalyst, to form selenite and iron oxide or iron oxyhydroxide. The iron oxide or iron oxyhydroxide forms an adsorbent. The process entails adsorbing the selenite onto the iron oxide or iron oxyhydroxide. Thereafter, the process entails directing the reject stream containing the adsorbed selenite to a solid/liquid separator and separating the iron oxide or iron oxyhydroxide and the adsorbed selenite from the reject stream to produce a substantially free selenium effluent.

In one embodiment, the reject stream in the selenate reduction reactor is maintained at a pH of approximately 7.5 for approximately 5 hours at approximately 80° C.

Another embodiment entails the method or process described in the preceding paragraph wherein the iron that is mixed with the reject includes ferrous ($Fe^{2+}$) ions, zero valent iron ($Fe^0$), or a combination of the two, and wherein the reduction of selenate to selenite oxidizes the $Fe^{2+}$ ions or Fe0 to ferric ($Fe^{3+}$) ions which forms hydrous ferric oxide and wherein the method includes adsorbing the selenite onto the hydrous ferric oxide.

In another embodiment, the method or process further entails mixing a nickel catalyst with the reject stream and iron to increase the oxidation-reduction reaction rate, and after selenate has been reduced to selenite and the selenite adsorbed onto iron oxide or iron oxyhydroxide, the method further includes subjecting the reject stream to a solid/liquid separation process where water substantially free of selenium is produced. The nickel catalyst is separated from the reject stream, and the iron oxide or iron oxyhydroxide having the selenite absorbed thereto is also separated and is suitable for disposal as a non-hazardous material.

Other objects and advantages of the present invention will become apparent and obvious from a study of the following description and the accompanying drawings which are merely illustrative of such invention.

DESCRIPTION OF EXEMPLARY EMBODIMENTS

Figure 1:
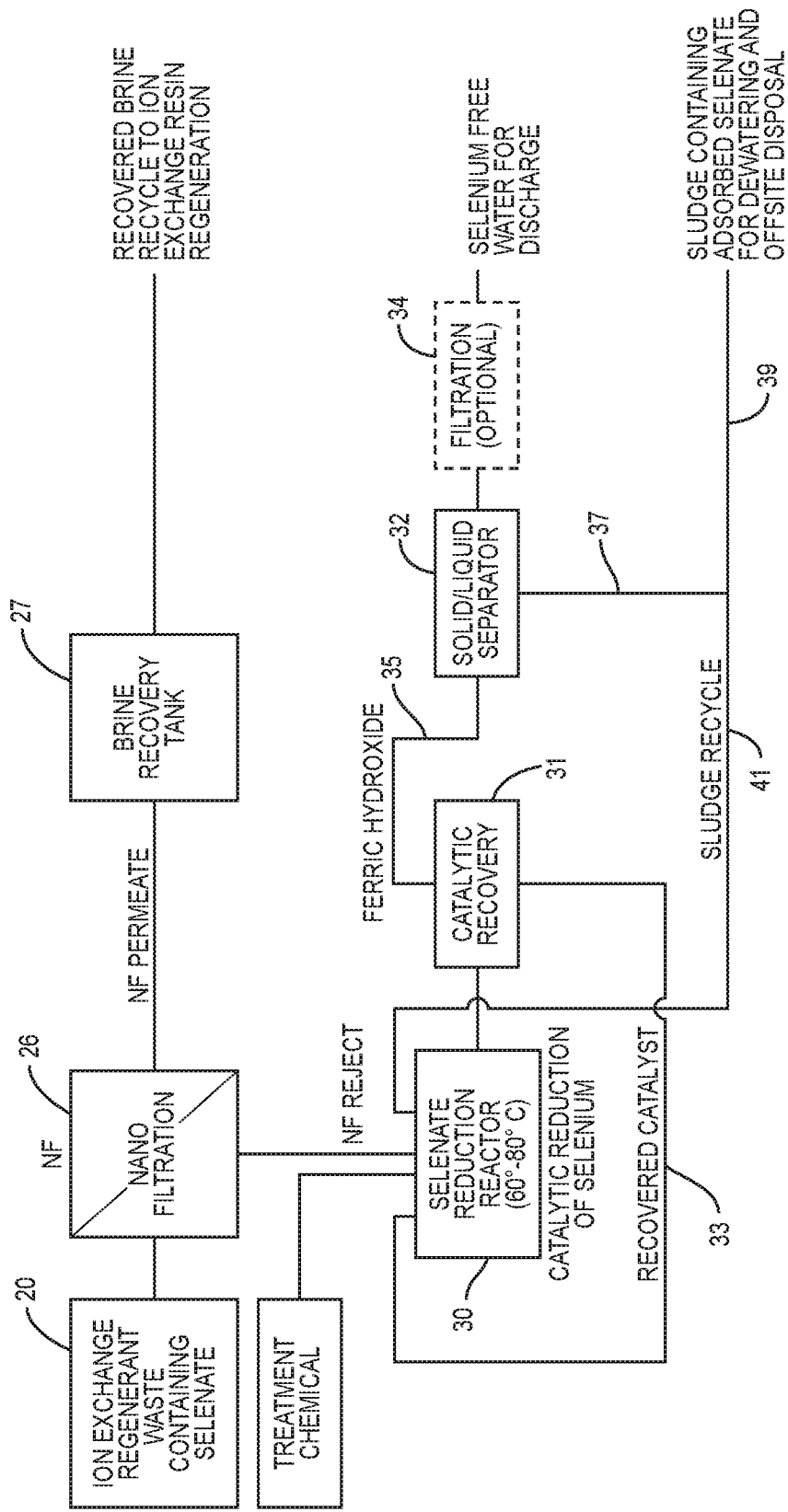
FIG. 1 is a schematic illustration of a process for removing selenate from an ion exchange regenerant stream.

Processes described herein are designed to remove selenium in wastewater streams, particularly to remove selenate from ion-exchange or adsorption media regenerant streams. Before discussing the processes, it may be beneficial to provide some background information relating to selenium, its various forms, why there is a need for cost effective and efficient processes for removing selenium, particularly selenate, from wastewater streams.

Sources of selenium in wastewater include oil and gas extraction, petroleum refining, coal-fired power generation, metals and mining industries, and other industrial activities. Selenium is also present in irrigation water and storm water runoff from agricultural operations located in areas with seleniferous soils. Selenium is a nutrient for biological systems. However, the safety margin between its nutrient and toxicity level is very narrow. Selenium has become a pollutant of concern around the world because of its potential effects on human health and the environment. In the USA, recently issued National Pollution Discharge Elimination System (NPDES) permits have forced industrial facilities to meet strict new discharge requirements for selenium (total selenium <5 µg/l). Several State Environmental Quality Boards have ruled that industries must achieve this selenium limitation in their surface water discharges. Globally, it is anticipated that the demand for treatment to remove selenium to the ppb level in industrial effluents will be significant within the next few years. As water quality standards become stricter, conventional treatment processes are constrained in reducing selenium to sub-ppb levels. Current state-of-the-art technologies do not offer an economically viable method to reduce selenium to the new discharge limitation.

Principal aqueous forms of selenium are selenite [Se (IV)] and selenate [Se (VI)], and their relative distributions are influenced by pH and redox condition. In an aquatic system, the anionic forms of selenious [Se (IV)] and selenic [Se (VI)] acids are found. Se (VI) is a strong acid, $H_2SeO_4$, which predominates under oxidizing conditions as $SeO_4^{2-}$ above pH 1.6. The chemical behavior of selenate [Se (VI)] is similar to that of sulfate. Se (IV), a weak acid ($H_2SeO_3$,) exists under moderately reducing conditions. At a pH below 8.15, the mono valent biselinite ion ($HSeO_3^{1-}$) is the dominant form, and above pH 8.15, the divalent selenite ion ($SeO_3^{-2}$) dominates.

With further reference to the drawing, a wastewater stream containing selenium is directed into an ion-exchange unit or an adsorption media unit (Block 20) for removing selenium from the wastewater stream With respect to adsorption media, the media can be engineered metal hydroxides or oxyhydroxides with high porosity and surface areas. Particle size of adsorption media can typically range between less than 10 nanometer (nm) and 200 micrometer (micron). In the process contemplated herein, a contaminated wastewater stream is directed through a selected adsorption media either in a downflow mode or an upflow mode and selenate in the water is adsorbed onto the media through surface complexation mechanisms. Like an ion-exchange process, when the media becomes saturated with selenate ions, it is regenerated with an alkali or salt. Like a regenerant employed in an ion-exchange application, the regenerant may have a concentration of selenate that is so high that it is not possible to dispose of through conventional means. Consequently, in the case of both an ion-exchange regenerant and an adsorption media regenerant, it is necessary to reduce the selenate concentration in these regenerant streams. Ion-exchange systems and processes, as well as adsorption media processes, are known but a brief overview of their use may be appropriate. In removing selenium in an ion-exchange unit, selenium ions are exchanged for desirable ions as the wastewater passes through granular chemicals known as ion-exchange resins. Both weak base and strong base anomic resins can be used for removing contaminants from a wastewater stream. Some resins useful in removing selenium may include mixed weak and strong base resins and these are sometimes called intermediate base anion exchange resins. Once the ion-exchange sites on the resin are completely or nearly completely full, the resin is regenerated for further use. Ion-exchange resins are normally placed in pressure vessels with the wastewater pumped through the bed of resins in a downflow or upflow direction. In regeneration, a sodium hydroxide solution can be used to regenerate both weak and strong base anion exchange resins.

With respect to adsorption media, the media can be engineered metal hydroxides or oxyhydroxides with high porosity and surface areas. Particle size of adsorption media can typically range between less than 10 nanometer (nm) and 200 micrometer (micron). In the process contemplated herein, a contaminated wastewater stream is directed through a selected adsorption media either in a downflow mode or an upflow mode and selenate in the water is adsorbed onto the media through surface complexation mechanisms. Like an ion-exchange process, when the media becomes saturated with selenate ions, it is regenerated with an alkali or salt. Like a regenerant employed in an ion-exchange application, the regenerant may have a concentration of selenate that is so high that it is not possible to dispose of through conventional means. Consequently, in the case of both an ion-exchange regenerant and an adsorption media regenerant, it is necessary to reduce the selenate concentration in these regenerant streams.

Hence forth, the description will simply refer to an ion exchange regenerant stream. As used herein, the term "ion exchange regenerant stream" is defined to include an absorption media regenerant stream.

At appropriate times, a regenerant from regenerant source is directed into and through an ion-exchange unit. As pointed out above, selenate ions associated with the ion-exchange unit will be exchanged for ions in the regenerant source, meaning that the concentration of selenate in the regenerant stream leaving the ion-exchange unit increases and often increases to the level that the regenerant stream must be treated in order to reduce the concentration of selenium. As discussed below, selenium is removed from the regenerant stream by converting selenate to selenite or elemental selenium and then adsorbing the selenite and elemental selenium onto an adsorbent and thereafter removing the adsorbent and selenium. See Block 20 in FIG. 1.

FIG. 1 shows a process for treating a regenerant stream containing selenate. The regenerant is directed into a membrane separation unit 26. In the case of this exemplary process, the membrane separation unit 26 comprises a nanofiltration membrane. Nanofiltration membrane 26 produces a permeate and a reject stream. The permeate is in the form of a brine and is directed to a brine recovery tank 27. Nanofiltration membrane 26 typically removes 99% of the selenate in the influent to the nanofiltration membrane. In some cases, the permeate or brine in the recovery tank can be recycled and utilized, in part at least, as the regenerant source for regenerating the ion-exchange unit.

Nanofiltration membrane 26 rejects selenium ions, including selenate. The reject stream produced by the nanofiltration membrane 26 will therefore contain selenate ions. This reject stream is directed to a selenate reduction reactor 30. There a reducing agent and a catalyst are mixed with the reject stream for the purpose of reducing selenate to selenite. In one embodiment, the residence time is approximately 5 hours. Various reducing reagents might be used. In one embodiment, iron is used as a reducing agent to reduce selenate to selenite. In particular, ferrous ($Fe^{2+}$) ion, in the form of a powder, is mixed with the reject stream in the selenate reduction reactor 30. It may be advantageous to control the pH of the reject stream in the selenate reduction reactor 30. It is contemplated that the reduction reaction is most efficient when the reject stream is maintained at a pH of 3.5-7.5. Preferably, the pH of the reject in the selenate reduction reactor 30 is maintained at approximately 7.5. Also, a catalyst is injected into the selenate reduction reactor 30 and mixed with the reducing agent and the reject stream. By adding a catalyst, the redox kinetics is made faster. In the present process, the catalyst added is nickel in the form of a powder. The catalyst and reducing agent may be added together or separately. In one embodiment, the combined iron and nickel powder comprises 30% nickel powder and 70% ion powder. This can vary. Further optimization of the process may lead to a lower nickel portion, especially considering the cost for nickel powder.

The reaction rate can be made even faster by increasing the temperature of the reject in the presence of the nickel powder. In one embodiment, the temperature is increased to 60°-80° C. Preferably, the temperature of the reject in the selenate reduction reactor 30 is about 80° C. In any event, the oxidation-reduction reaction brought about by the iron in the presence of the nickel powder will reduce selenate to selenite in the selenate reduction reactor 30.

In the selenate reduction reactor, iron ($Fe^{2+}$ or $Fe^{0}$) will be oxidized to ferric ($Fe^{3+}$) which will eventually form hydrous iron oxide or iron oxyhydroxide. The hydrous ferric oxide will form an adsorbent in the selenate reduction reactor 30. This will result in selenite, as well as $Se^{0}$, being removed by adsorption onto the iron oxide or iron oxyhydroxide.

Contents of the selenate reduction reactor 30 are first directed to a catalyst recovery unit 31. Various types of recovery units can be used here. For example, a gravity settler that is effective to separate solids according to specific gravity can be employed. In this case, the catalyst, nickel, will have a specific gravity greater than the adsorbent compound, iron oxide or iron oxyhydroxide. For example, nickel has a specific gravity of about 8.9 while hydrous iron oxide has a specific gravity of about 4.3. In this case, the nickel will settle to the bottom of the catalyst recovery unit 31. Note in FIG. 1 where the settled catalyst is recycled via line 33 to the selenate reduction reactor 30. The ferric hydroxide or oxyhydroxide sludge can be removed at a point above where the nickel is removed. Note in FIG. 1 where the ferric oxide or oxyhydroxide sludge is directed through line 35 to a solid/liquid separator 32. The ferric oxide or oxyhydroxide sludge contains adsorbed selenite, as well as elemental selenium and can be subjected to a dewatering process. Dewatering the ferric oxide or oxyhydroxide sludge produces a non-hazardous hydrous iron oxide or oxyhydroxide cake that can be hauled off-site for disposal.

Solid/liquid separator 32 produces a clarified effluent that can be directed to a filtration unit 34. Note that the filtration unit 34 is optional and is not essential in various cases. In any event, if filtration is employed, the filtration unit 34 can be a multimedia filter or a cartridge filter for removing residual suspended solids from the clarified effluent. In any event, the effluent produced by the solid/liquid separator 32, or the filtration unit 34 if employed, is substantially free of selenium and can be discharged or otherwise used. The effluent from the solid/liquid separator 32 or the filtration unit 34 will typically have a selenium concentration less than 5 ppb.

Solid/liquid separator 32 produces a sludge that is directed from the solid/liquid separator into line 37. Thereafter, the sludge is split with one portion of the sludge being recycled via line 41 to the selenate reduction reactor 30. The other portion of the sludge is directed through line 39. This sludge contains adsorbed selenate and can be subjected to dewatering and off-site disposal.

Figure 2:
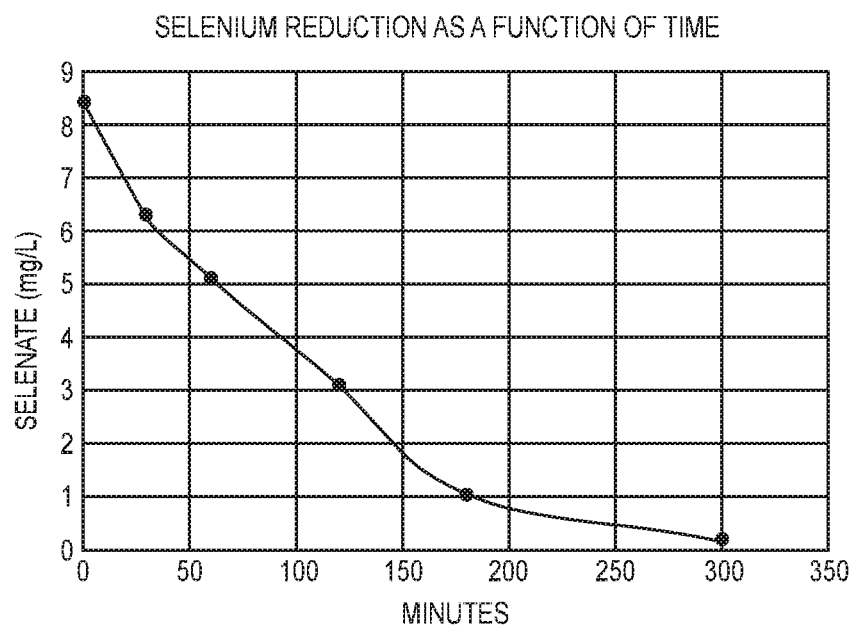
FIG. 2 is a graph that, based on tests conducted, shows selenium reduction as a function of time.

Tests conducted using the process described above shows that the present process is very effective in removing selenate from an iron exchange regenerant stream. In one test, an ion exchange regenerant was treated with 5 g/l of iron and nickel powder at 80° C. at a pH for 5 hours. The regenerant contained only selenate. Selenate in the ion exchange regenerant stream was reduced from 8.5 mg/L to less than 0.1 mg/L. See FIG. 2.

Another test was conducted and the results are shown in Table 1 below.

TABLE 1

| Jar 1 | |
|---|---|
| Sulfate (mg/L) | 14,800 |
| Chloride (mg/L) | 0 |
| Selenium (mg/L) | 8.2 |
| NiFe powder (g/L) | 10 |
| pH | 7.5 |
| | ~80 C. for 5 hr., then 200 ppm FeCl3, 0.45 um filter |
| Effluent Se (ppb) | 25.6 |

Note:
All selenium is expressed as selenate.

In this test, the ion exchange brine contained 8.2 mg/L of selenate and 14,800 mg/L of sulfate. The brine was treated with 10 g/L of the iron and nickel powder as 80° C. at a pH of 7.5 for 5 hours. In this test, the selenate was reduced from 8.2 mg/L to 0.025 mg/L.

TABLE 2

| Jar 2 | |
|---|---|
| Sulfate (mg/L) | 14,800 |
| Chloride (mg/L) | 30,000 |
| Selenium (mg/L) | 8.2 |
| NiFe powder (g/L) | 10 |
| pH | 7.5 |
| | ~80 C. for 5 hr., then 200 ppm FeCl3, 0.45 um filter |
| Effluent Se (ppb) | 31.9 |

Note:
All selenium is expressed as selenate.

In this test, the ion exchange brine also contained 8.2 mg/L of selenate and 14,800 mg/L of sulfate, as well as 30,000 mg/L of chloride. This brine was treated with 10 g/L of the iron and nickel powder at 80° C. at a pH of 7.5 for 5 hours. In this test, the selenate was reduced from 8.2 mg/L to 0.03 mg/L.

TABLE 3

| Jar 3 | |
|---|---|
| Sulfate (mg/L) | 14,800 |
| Chloride (mg/L) | 30,000 |
| Selenium (mg/L) | 8.2 |
| NiFe powder (g/L) | 20 |
| pH | 7.5 |
| | ~80 C. for 5 hr., then 200 ppm FeCl3, 0.45 um filter |
| Effluent Se (ppb) | 9.2 |

Note:
All selenium is expressed as selenate.

In this test, the ion exchange brine again contained 8.2 mg/L of selenate, 14,800 mg/L of sulfate and 30,000 mg/L of chloride. In this test, the brine was treated with 20 g/L of the iron and nickel powder at 80° C. at a pH of 7.5 for 5 hours. Here the selenate was reduced from 8.2 mg/L to less than 0.01 mg/L.

The above process is a practical and cost effective way of removing selenium from a wastewater stream. Summarizing, various forms of selenium are captured on ion-exchange resin, the selenium can be transferred to a regenerant stream. Thereafter, the regenerant stream is processed by a nanofiltration membrane which produces a reject stream containing the selenium including selenate. Thereafter, selenate is reduced to selenite and adsorbed on iron oxide or oxyhydroxide which can then be removed from the reject stream through a solid/liquid separation process, after which the iron oxide or oxyhydroxide with the adsorbed selenite and elemental selenium is subjected to a dewatering process that results in a dewatered iron oxide or oxyhydroxide having selenite and elemental selenium adsorbed thereon which can be appropriately disposed of.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of removing selenium from a wastewater stream comprising:
   a. directing the wastewater stream to an ion exchange unit containing a resin and removing the selenium from the wastewater stream by adsorbing selenate onto the resin;
   b. regenerating the resin in the ion exchange unit and in the process producing a regenerant stream containing selenate;
   c. treating the regenerant stream having the selenate by:
      i. processing the regenerant stream in a nanofiltration membrane to produce a permeate substantially free of selenate and a reject stream containing the selenate;
      ii. mixing 5-20 mg/L of iron and nickel powder with the reject stream in a selenate reduction reactor;
      iii. increasing the temperature of the reject stream, in the presence of the nickel powder, in the selenate reduction reactor to 60-80° C.;
      iv. wherein an oxidation-reduction reaction occurs, in the presence of the nickel powder which functions as a catalyst, that reduces the selenate to senenite ($SeO_3^{2-}$) or elemental selenium;
      v. wherein the iron that is mixed with the reject stream includes zero valent iron ($Fe^0$), and wherein the reduction of selenate to selenite or elemental selenium oxidizes the zero valent iron to ferric ($Fe^{3+}$) ions which form hydrous ferric oxide or iron oxyhydroxide;

vi. adsorbing the selenite or elemental selenium onto the hydrous ferric oxide or iron oxyhydroxide;

vii. directing the reject stream from the selenate reduction reactor to a nickel recovery unit and separating the nickel from the reject stream;

viii. recycling the separated nickel from the nickel recovery unit to the selenate reduction reactor;

ix. recovering the hydrous ferric oxide or iron oxyhydroxide and the adsorbed selenite or elemental selenium in the form of a slurry from the reject stream;

x. directing the slurry containing the hydrous ferric oxide or iron oxyhydroxide and the adsorbed selenite or elemental selenium to a solid-liquid separator that produces a clarified effluent that is substantially free of selenium and a sludge;

xi. splitting the sludge produced by the solid-liquid separator into first and second portions;

xii. recycling said first portion of the sludge to said selenate reduction reactor, and xiii. wherein the second portion of the sludge contains adsorbed selenite or elemental selenium and is subjected to dewatering and off-site disposal.

2. The method of claim 1 further including maintaining the pH of the reject stream in the selenate reduction reactor at approximately 7.5.

3. The method of claim 1 including maintaining a residence time in the selenate reduction reactor of approximately 5 hours.

4. The method of claim 1 wherein the permeate produced by the nanofiltration unit is substantially free of selenate; and the method further includes regenerating a resin in an ion exchange unit, in part at least, by directing the permeate produced by the nanofiltration unit into the ion exchange unit.

* * * * *